United States Patent
Wang et al.

(10) Patent No.: US 11,146,933 B2
(45) Date of Patent: Oct. 12, 2021

(54) ACTIVITY DRIVEN SMART HOME SYSTEM

(71) Applicant: Samsung Electronics Co., Ltd., Suwon-si (KR)

(72) Inventors: Yu Wang, Seattle, WA (US); Pei Zheng, Seattle, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 15/271,204

(22) Filed: Sep. 20, 2016

(65) Prior Publication Data
US 2018/0084057 A1    Mar. 22, 2018

(51) Int. Cl.
| H04L 29/08 | (2006.01) |
| H04W 4/00 | (2018.01) |
| H04W 4/70 | (2018.01) |
| H04W 88/02 | (2009.01) |
| H04L 29/06 | (2006.01) |

(52) U.S. Cl.
CPC ............ H04W 4/70 (2018.02); H04L 67/306 (2013.01); H04L 67/42 (2013.01); H04W 88/02 (2013.01)

(58) Field of Classification Search
CPC ...... H04L 67/125; H04L 67/306; H04W 4/70; H04W 4/005; G06F 17/30867
USPC ........................................................ 709/223
See application file for complete search history.

(56) References Cited

U.S. PATENT DOCUMENTS

| 9,026,941 | B1* | 5/2015 | Krueger | G06F 16/00 715/812 |
| 9,195,972 | B2* | 11/2015 | Gopinath | G06Q 10/1093 |
| 9,679,491 | B2* | 6/2017 | Canoy | G06N 20/00 |
| 9,736,652 | B2* | 8/2017 | Su | H04W 4/021 |
| 10,047,971 | B2* | 8/2018 | Nyamjav | G05B 15/02 |
| 10,885,905 | B2* | 1/2021 | Srinivasan | G06N 3/08 |
| 2014/0108019 | A1 | 4/2014 | Ehsani et al. | |
| 2017/0140041 | A1* | 5/2017 | Dotan-Cohen | G06F 16/335 |

FOREIGN PATENT DOCUMENTS

| CN | 101782768 A | 7/2010 |
| CN | 103592925 A | 2/2014 |

* cited by examiner

Primary Examiner — Esther B. Henderson
Assistant Examiner — Nazia Naoreen (57) ABSTRACT

A cloud computing server includes a memory, a processor, and a communication unit. The memory is configured to store a plurality of activities, a plurality of actions, and an association model that associates the plurality of activities with the plurality of actions. The processor is configured to determine an activity from the plurality of activities by determining a similarity between an upcoming activity and one of the plurality of activities and identify an action based on the activity and the association model. The communication unit is configured to transmit the identified action to a user equipment (UE).

20 Claims, 6 Drawing Sheets

ACTIVITY DRIVEN SMART HOME SYSTEM

TECHNICAL FIELD

This disclosure relates generally to smart home technology. More specifically, this disclosure relates to an activity driven smart home system.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

In a first embodiment, a cloud computing server includes a memory, a processor, and a communication unit. The memory is configured to store a plurality of activities, a plurality of actions, and an association model that associates the plurality of activities with the plurality of actions. The processor is configured to determine an activity from the plurality of activities by determining a similarity between an upcoming activity and one of the plurality of activities and identify an action based on the activity and the association model. The communication unit is configured to transmit the identified action to a user equipment (UE).

In a second embodiment, a method for recommending one or more actions includes determine an activity from a plurality of activities by determining a similarity between an upcoming activity and one of the plurality of activities, generating an association model from a cloud based database, and identifying an action based on the association model and the determined activity. The method also includes transmitting the recommended one or more actions to a user equipment (UE).

In a third embodiment, a non-transitory computer readable medium embodying a computer program having computer readable program code that when executed causes at least one processing device to determine an activity from a plurality of activities by determining a similarity between an upcoming activity and one of the plurality of activities, generating an association model from a cloud based database, and identifying an action based on the association model and the determined activity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
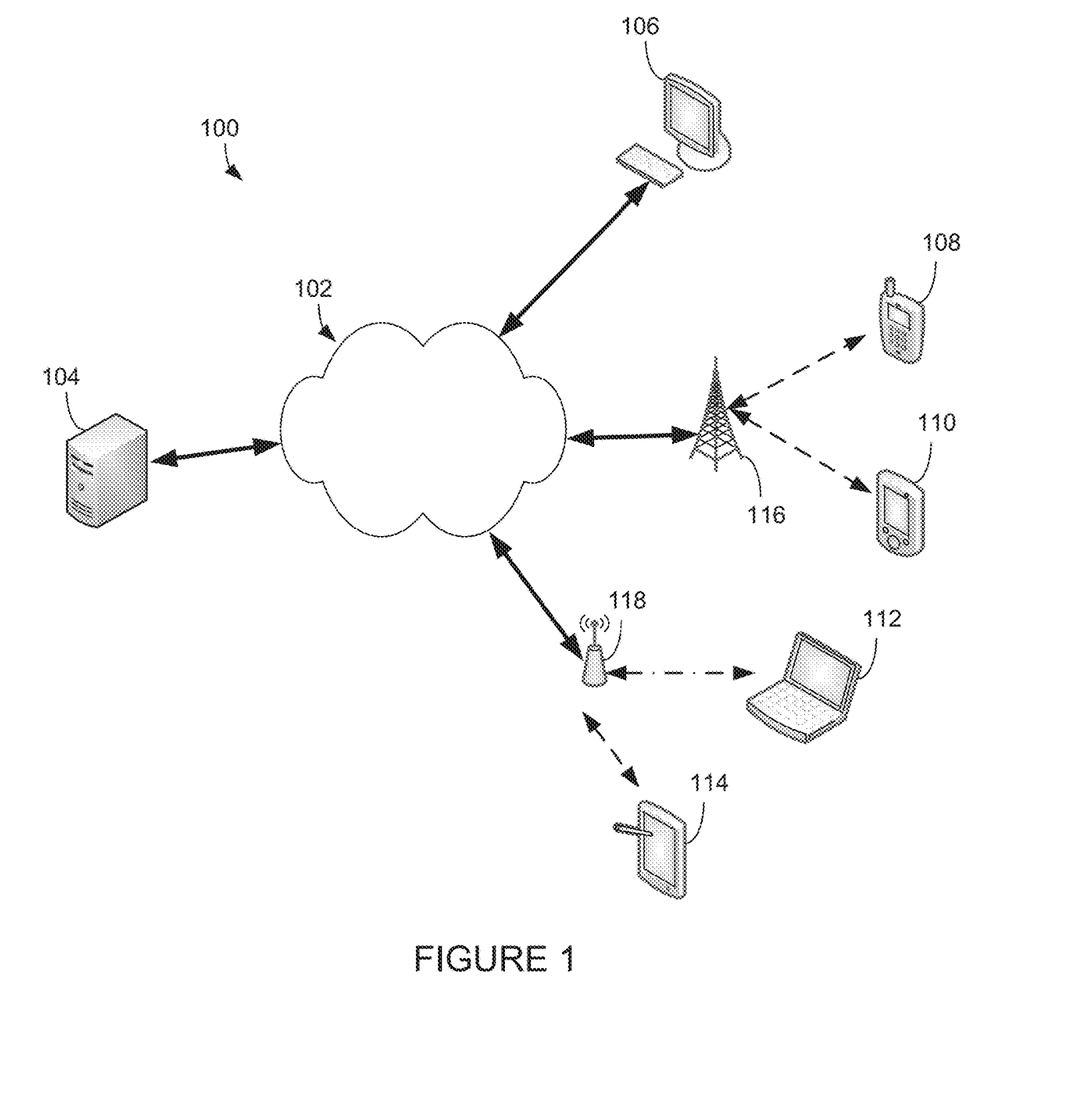
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various user equipments (UEs) 106-114. Each server 104 includes any suitable computing or processing device that can provide computing services for one or more UEs. Each server 104 could, for example, include one or more processing devices, one or more memories storing instructions and data, and one or more network interfaces facilitating communication over the network 102.

Each UE 106-114 represents any suitable computing or processing device that interacts with at least one server or other computing device(s) over the network 102. In this example, the UEs 106-114 include a desktop computer 106, a mobile telephone or smartphone 108, a personal digital assistant (PDA) 110, a laptop computer 112, and a tablet computer 114. However, any other or additional UEs could be used in the computing system 100. Additional UE according to various embodiments of the present disclosure may include at least one of, for example, an electronic book reader (e-book reader), a workstation, a server, a Personal Digital Assistant (PDA), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the UE may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC, APPLE TV®, or GOOGLE TV®), a game console (e.g., XBOX® and PLAYSTATION®), an electronic dictionary, an electronic key, a camcorder, and an electronic photo frame.

According to another embodiment, the UE may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, a UE for a ship (e.g., a navigation device for a ship or a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the UE may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the UE may be a combination of one or more of the aforementioned various devices. According to some embodiments, the UE may also be a flexible device. Further, the UE according to an embodiment of the present disclosure is not limited to the aforementioned devices, and may include a new UE according to the development of technology.

In this example, some UEs 108-114 communicate indirectly with the network 102. For example, the UEs 108-110 communicate via one or more base stations 116, such as cellular base stations or eNodeBs. Also, the UEs 112-114 communicate via one or more wireless access points 118, such as IEEE 802.11 wireless access points. Note that these are for illustration only and that each UE could communicate directly with the network 102 or indirectly with the network 102 via any suitable intermediate device(s) or network(s).

As described in more detail below, the computing system 100 may automatically identify one or more activities on a user's calendar and intelligently generate actions or action reminders corresponding to the one or more activities.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
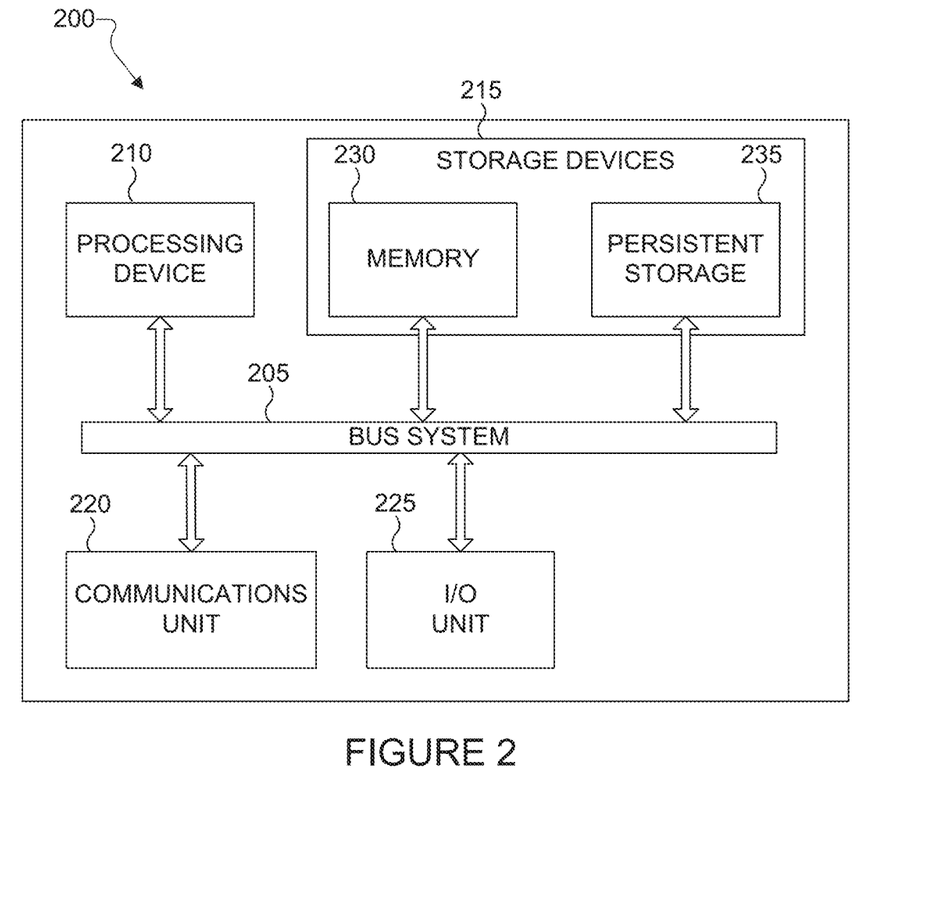
FIGS. 2 and 3 illustrate example devices in a computing system according to this disclosure.
Figure 3:
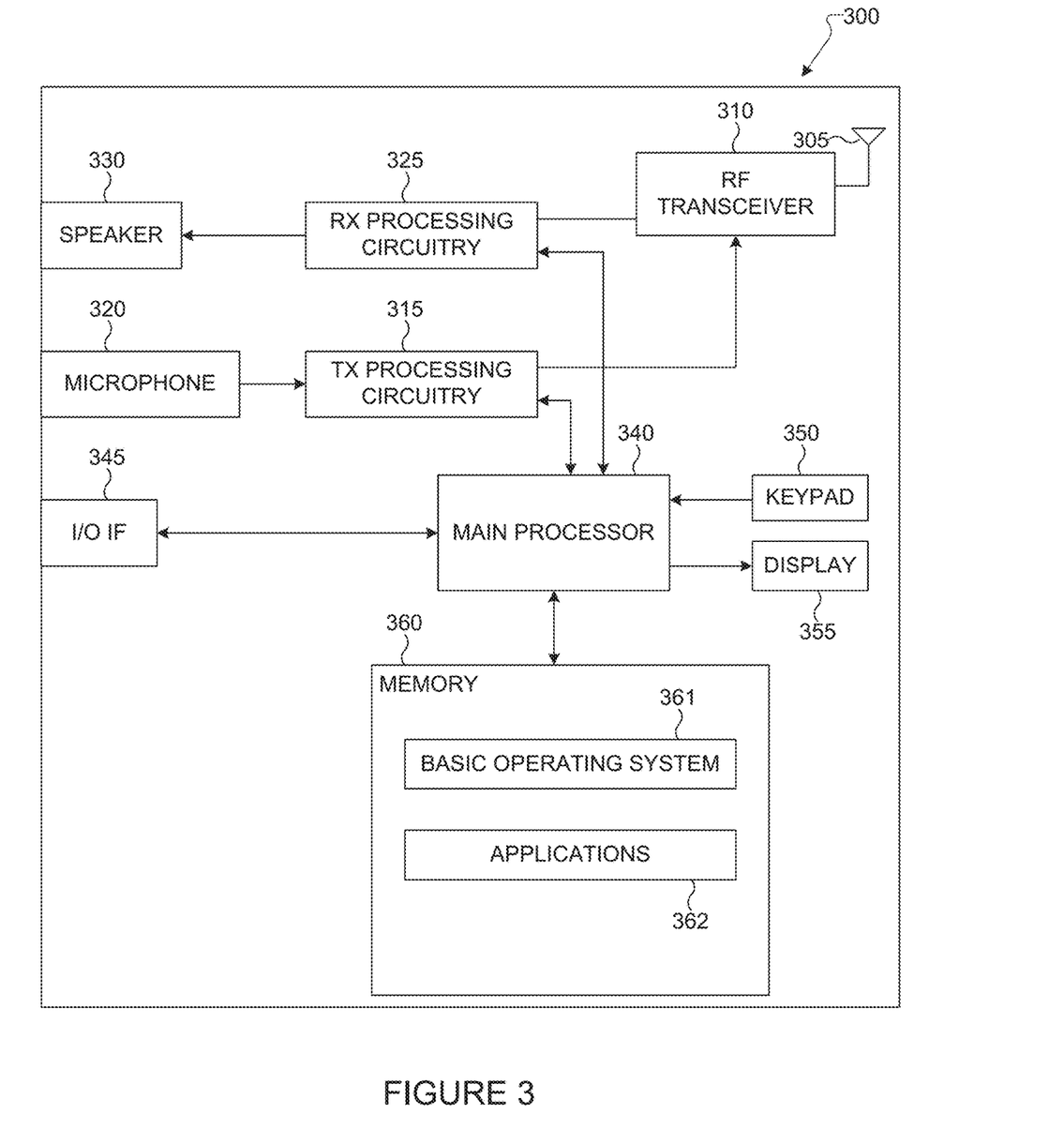

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent one or more of the UEs 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the UEs 106-114. For example, a laptop or desktop computer could have the same or similar structure as that shown in FIG. 2.

As described in more detail below, the server of FIG. 2 may host a cloud based system for driving a smart home system.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, UEs could be configured to operate as other types of mobile or stationary devices. In addition, as with computing and communication networks, UEs and servers can come in a wide variety of configurations, and FIGS. 2 and 3 do not limit this disclosure to any particular UE or server.

Figure 4:
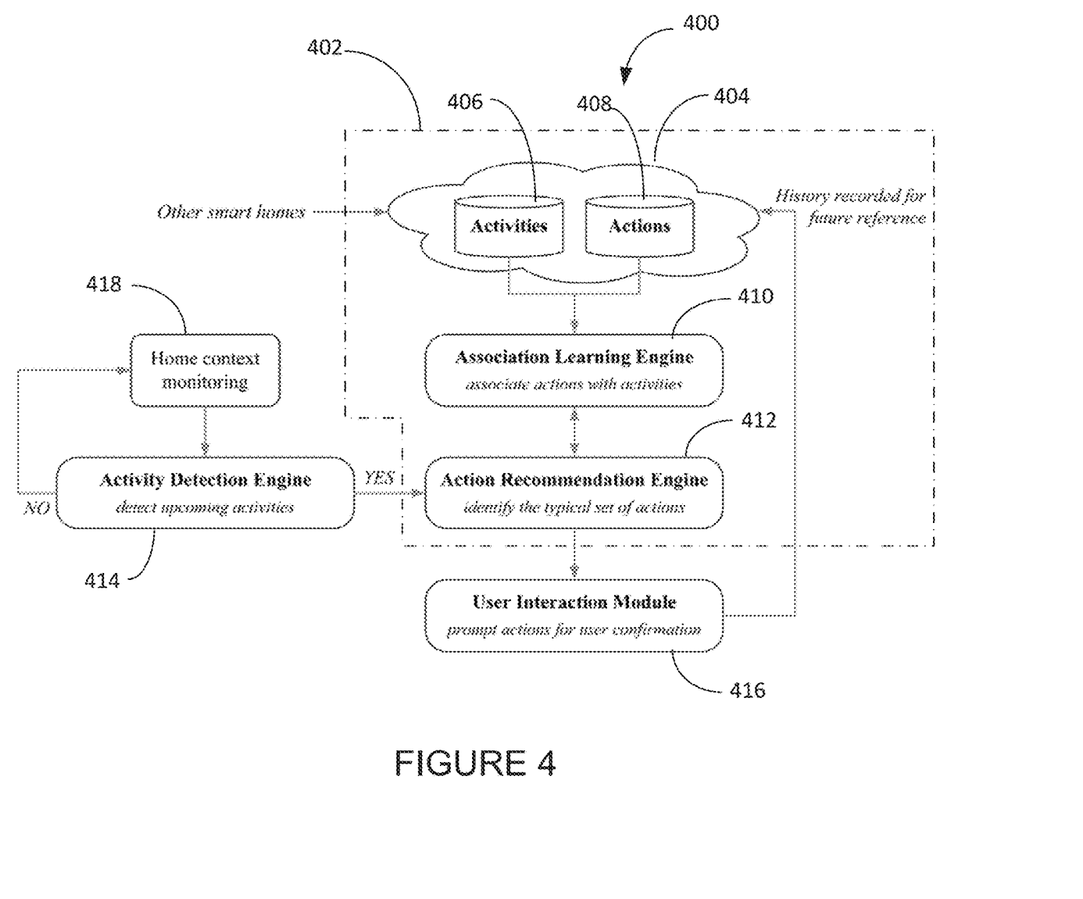
FIG. 4 illustrates an example smart home system according to this disclosure.

FIG. 4 illustrates an example smart home system according to this disclosure. As shown in FIG. 4, the system 400 includes a cloud computing server 402 that may be implemented by, e.g., server 200 of FIG. 2. Cloud computing server 402 includes a cloud based database 404 that may be stored in a memory, e.g., memory 230. The cloud based database stores activity information 406 and action information 408. Activity information 406 is information regarding events that may occur in a user's professional or personal life. Action information 408 is information regarding interactions that may be or have been performed between a user and a UE. The cloud based database 404 stores activity information 406 and action information 408 from multiple sources, e.g., any smart home connected to the cloud computing server 402.

The cloud computing server 402 also includes an association learning engine 410 that may be executed by, e.g., processing device 210. Association learning engine 410 constructs an association model between activity information 406 and action information 408. The association model characterizes a typical set of action with an activity. The association learning engine 410 constructs the association model by mining a user's daily life. Specifically, the association learning engine 410 identifies feature information that includes activities, actions, and the temporal relation between the activities and the actions.

For example, in the daily family life, it is likely that similar activities happen now and then. Moreover, among all the smart homes, one can expect that similar activities occur in some of them. With enough such occurrences, the association learning engine 410 can identify the association between activities and actions by adopting sequential mining. For example, the association learning engine 410 may determine that a UE, such as a connected car, is always refueled (i.e., an action) before a road trip (i.e., an activity), and can thus associate the action to the activity.

The cloud computing server 402 also includes an action recommendation engine 412 that may be executed by, e.g., processing device 210. The action recommendation engine 412 recommends a typical set of actions given an upcoming activity and the available UEs in the smart home. When an activity is captured by an activity detection engine 414, the action recommendation engine 412 will first check the cloud based database 404 to see if the exact activity has happened before. If not, it will find similar activities. Various methods can be adopted to quantify the similarity between two activities. For example, by defining similarity in terms of type of activity, age, profession, and education level of involved user, profile of family, the similarity can be determined using known filtering methods, e.g., collaborative filtering, to determine if the similarity between the upcoming activity and an activity stored in the cloud based database 404 is within a predetermined range. Then, the action recommendation engine 412 will apply the association model and identify the typical set of associated actions with the available UEs. Because the association model is built based on crowdsourcing data, the action recommendation engine 412 is able to suggest the most likely actions, even if the upcoming activity is the first occurrence in a particular home.

The activity detection engine 414 detects user's upcoming activities against a daily routine. The activity detection engine may be executed by, e.g., processing device 210 or by a processor 340 in a UE 300 as shown in FIG. 3. The activity detection engine 414 may detect both personal and professional activities that will happen in the future. For example, by checking user's calendar, the activity detection engine 414 may determine that a family member's birthday is approaching or the user is scheduled to attend a meeting the next day. The activity detection engine 414 may detect also detect an activity based on a user input. The activity detection engine 414 may be based in the cloud computing server 402 or may be located locally at a user's home.

The user interaction module 416 is a UE, such as UE 300, that a user may interact with in his or her home. Specifically, the user interaction module 416 may determine user's current whereabouts and then prompt the recommended actions to the user at his or her convenience. For example, this interaction can be a push notification on mobile device if it is at hand or a pop-up message on smart TV if the user is watching TV. Once the recommended actions are either confirmed or refused by the user, the user interaction module 416 will record the context for future association learning/updating purpose and store the action in the cloud based database 404.

A home context monitoring module 418, which may be executed by a processor 340 of an UE 300 as shown in FIG. 3, determines the type of UE that are located in the home. The home context monitoring module 418 also determines which users are currently in the home.

Figure 5:
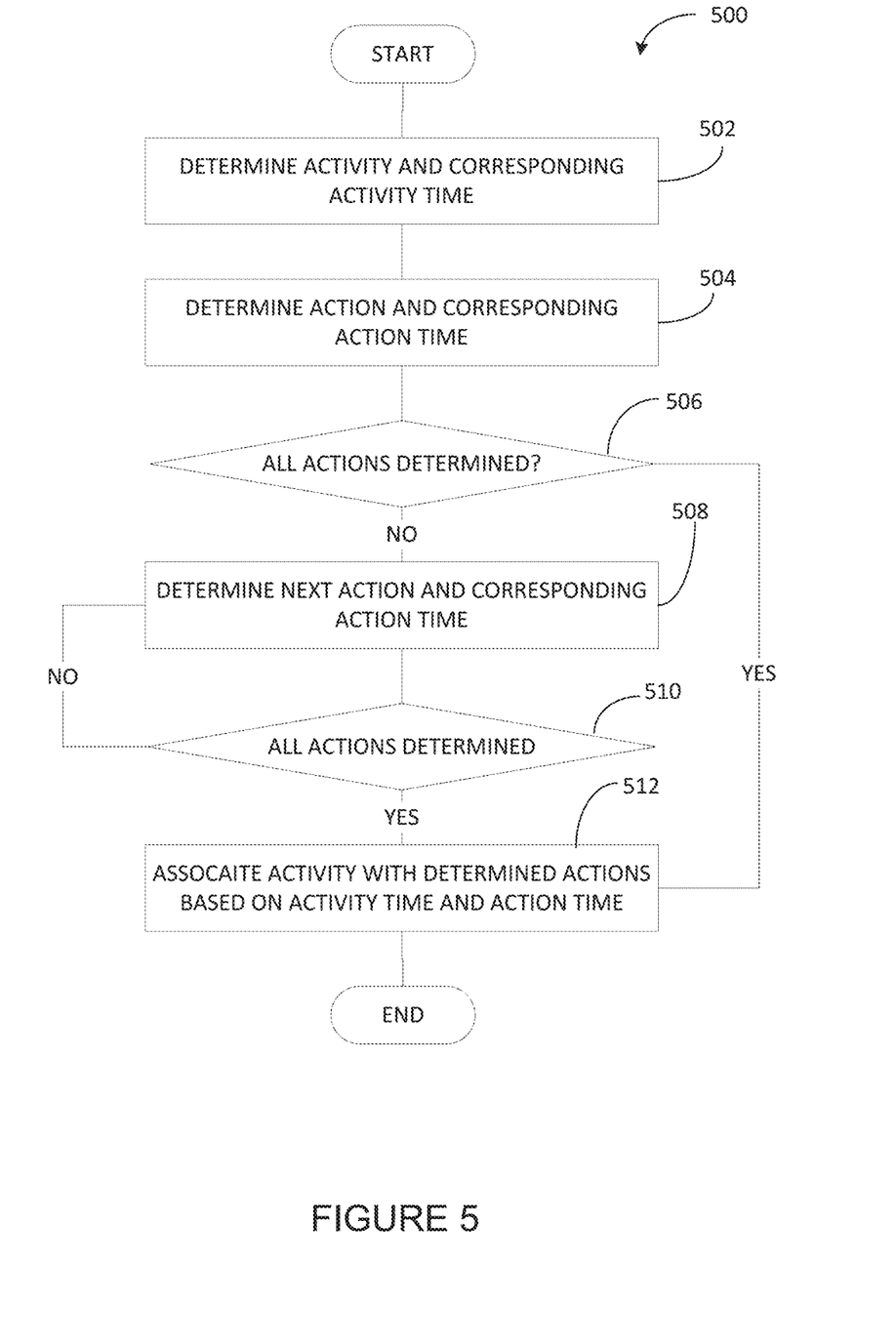
FIG. 5 illustrates an example method for constructing an association model according to this disclosure.

FIG. 5 illustrates an example method for constructing an association model according to this disclosure. As shown in FIG. 5, the method 500 begins in process 502 where the activity detection engine 414 determines an activity and a time corresponding to the activity. In process 504, the user interaction module 416 determines an action and a time corresponding to the action. In process 506, one or more user interaction modules 416 determine whether there are any additional actions being performed. If there are additional actions being performed by one or more user interaction modules 416, the next action is determined with a time corresponding to the action. In process 510, a determination is made once again whether all actions have been determined. If all actions have not been determined, the method returns to process 508. If all actions have been determined, the method proceeds to process 512 where the association learning engine 410 generates the association model by associating one or more actions with an activity based on the time recorded for the actions and the activity and stores the association model in the cloud based database 404.

Figure 6:
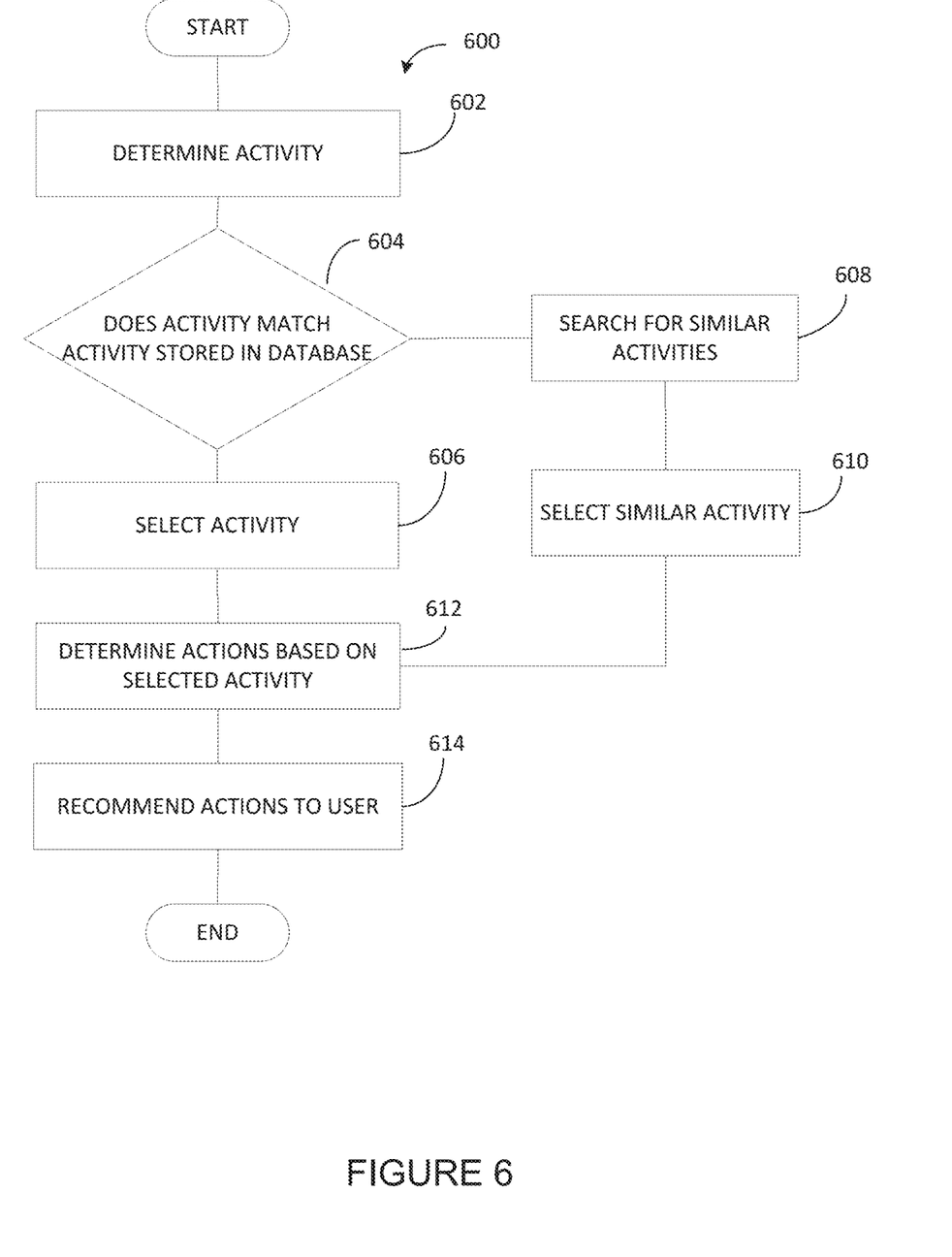
FIG. 6 illustrates an example method for recommending a set of action based on an activity according to this disclosure.

FIG. 6 illustrates an example method for recommending a set of action based on an activity according to this disclosure. As shown in FIG. 6, the method 600 begins in process 602 where the activity detection engine 414 determines that an upcoming activity. In process 604, the action recommendation engine 412 checks the cloud based database 404 for a matching activity. If there is a matching activity in the cloud based database 404, the matching activity is selected in process 606. If there is no matching activity, the process proceeds to process 608 where the action recommendation engine 412 searches for similar activities in the cloud based database 404. Once a similar activity is found, the similar activity is selected by the action recommendation engine 412 in process 610. In process 612, the action recommendation engine 412 determines the action associated with the selected activity based on an association model stored in the cloud based database 404. In process 614, the user interaction module 416 recommends one or more actions to one or more users.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module,"

"device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A cloud computing server comprising:
  a memory configured to store a plurality of activities obtained from a plurality of homes, a plurality of actions obtained from the plurality of homes, and an association model that associates the plurality of activities with the plurality of actions, wherein:
    each activity comprises an activity time and an activity type and each action comprises an action time;
    the association model is constructed by comparing the activity time of each of the plurality of activities obtained from the plurality of homes with the action time of each of the plurality of actions obtained from the plurality of homes; and
    the association model includes a defined activity of the plurality of activities with (i) a first action to be performed by a first user equipment when a first temporal relation between the activity time of the defined activity and a first action time of the first action is less than a predetermined time interval and (ii) a second action to be performed by a second user equipment when a second temporal relation between the activity time of the defined activity and a second action time of the second action is less than the predetermined time interval;
  a processor configured to:
    determine a similarity between an activity type of an upcoming activity and the activity type of the defined activity, where the similarity is determined based on the similarity being within a predetermined range;
    based on the determined similarity, identify the upcoming activity as corresponding to the defined activity; and
    identify the first action and the second action associated with the defined activity based on the association model, the first temporal relation associated with the first action, and the second temporal relation associated with the second action; and
  a communication unit configured to:
    transmit a first signal associated with the first action to the first user equipment, and
    transmit a second signal associated with the second action to the second user equipment;
  wherein the first signal is configured to cause the first user equipment to perform the first action at a first time based on the first temporal relation relative to the upcoming activity and the second signal is configured to cause the second user equipment to perform the second action at a second time based on the second temporal relation relative to the upcoming activity.

2. The cloud computing server of claim 1, wherein the processor is configured to receive the upcoming activity via the communication unit.

3. The cloud computing server of claim 1, wherein the upcoming activity is determined based on a user's calendar.

4. The cloud computing server of claim 1, wherein:
  the similarity is based on one or more properties of the upcoming activity and one or more properties of the defined activity; and
  the one or more properties comprise an age of a user, profession of the user, education level of the user, or profile of a family.

5. The cloud computing server of claim 4, wherein the processor is configured to assign one or more actions from the plurality of actions to one or more activities of the plurality of activities in the association model.

6. A method for recommending one or more actions, the method comprising:
  determining a similarity between an activity type of an upcoming activity and an activity type of a defined activity of a plurality of activities obtained from a plurality of homes, where the similarity is determined based on the similarity being within a predetermined range;
  based on the determined similarity, identifying the upcoming activity as being the defined activity;
  identifying a first action and a second action associated with the defined activity based on an association model, a first temporal relation associated with the first action, and a second temporal relation associated with the second action, wherein:
    the association model is constructed by comparing an activity time of each of the plurality of activities obtained from the plurality of homes with an action time of each of a plurality of actions obtained from the plurality of homes; and
    the association model includes the defined activity with (i) the first action to be performed by a first user equipment when the first temporal relation between the activity time of the defined activity and a first action time of the first action is less than a predetermined time interval and (ii) the second action to be performed by a second user equipment when the second temporal relation between the activity time of the defined activity and a second action time of the second action is less than the predetermined time interval;
  transmitting a first signal associated with the first action to the first user equipment and
  transmitting a second signal associated with the second action to the second user equipment;
  wherein the plurality of activities and the plurality of actions obtained from the plurality of homes are stored in a cloud based database; and
  wherein the first signal causes the first user equipment to perform the first action at a first time based on the first temporal relation relative to the upcoming activity and the second signal causes the second user equipment to perform the second action at a second time based on the second temporal relation relative to the upcoming activity.

7. The method of claim 6, wherein identifying the upcoming activity comprises comparing the upcoming activity to the plurality of activities stored in the cloud based database.

8. The method of claim 6, wherein:
  the similarity is based on one or more properties of the upcoming activity and one or more properties of the defined activity; and
  the one or more properties comprise an age of a user, profession of the user, education level of the user, or profile of a family.

9. The method of claim 7, wherein associations between the defined activity and the first and second actions are stored in the cloud based database.

10. A non-transitory computer readable medium embodying a computer program, the computer program comprising computer readable program code that when executed causes at least one processor to:
determine a similarity between an activity type of an upcoming activity and an activity type of a defined activity of a plurality of activities obtained from a plurality of homes, where the similarity is determined based on the similarity being within a predetermined range;
based on the determined similarity, identify the upcoming activity as being the defined activity;
identify a first action and a second action associated with the defined activity based on an association model, a first temporal relation associated with the first action, and a second temporal relation associated with the second action, wherein the association model is constructed by comparing an activity time of each of the plurality of activities obtained from the plurality of homes with an action time of each of a plurality of actions obtained from the plurality of homes, wherein the association model includes the defined activity of the plurality of activities with (i) the first action to be performed by a first user equipment when the first temporal relation between the activity time of the defined activity of the plurality of activities and a first action time of the first action is less than a predetermined time interval and (ii) the second action to be performed by a second user equipment when the second temporal relation between the activity time of the defined activity and a second action time of the second action is less than the predetermined time interval;
transmit a first signal associated with the first action to the first user equipment; and
transmit a second signal associated with the second action to the second user equipment;
wherein the plurality of activities and a plurality of actions obtained from the plurality of homes are stored in a cloud based database; and
wherein the first signal causes the first user equipment to perform the first action at a first time based on the first temporal relation relative to the upcoming activity and the second signal causes the second user equipment to perform the second action at a second time based on the second temporal relation relative to the upcoming activity.

11. The non-transitory computer readable medium of claim 10, wherein the computer readable program code that when executed causes the at least one processor to identify the upcoming activity comprises:
computer readable program code that when executed causes the at least one processor to compare the upcoming activity to the plurality of activities stored in the cloud based database.

12. The non-transitory computer readable medium of claim 10, wherein:
the similarity is based on one or more properties of the upcoming activity and one or more properties of the defined activity; and
the one or more properties comprise an age of a user, profession of the user, education level of the user, or profile of a family.

13. The cloud computing server of claim 1, wherein the processor is further configured to:
determine a location corresponding to each of the plurality of activities and each of the plurality of actions;
determine that a third user equipment is currently at the location corresponding to the first action; and
in response to determining that the third user equipment is currently at the location corresponding to the first action, control the communication unit to transmit a third signal associated with the first action to the third user equipment.

14. The method of claim 6, further comprising:
determining a location corresponding to each of the plurality of activities and each of the plurality of actions;
determining that a third user equipment is currently at the location corresponding to the first action; and
in response to determining that the third user equipment is currently at the location corresponding to the first action, transmitting a third signal associated with the first action to the third user equipment.

15. The non-transitory computer readable medium of claim 10, wherein the computer program further comprises computer readable program code that when executed causes the at least one processor to:
determine a location corresponding to each of the plurality of activities and each of the plurality of actions;
determine that a third user equipment is currently at the location corresponding to the first action; and
in response to determining that the third user equipment is currently at the location corresponding to the first action, initiate transmission of a third signal associated with the first action to the third user equipment.

16. The cloud computing server of claim 1, further comprising:
an association learning engine configured to construct the association model based on temporal relations between the plurality of activities and the plurality of actions.

17. The cloud computing server of claim 16, wherein the processor is configured to determine the similarity between the activity type of the upcoming activity and the activity type of the defined activity based on the association model constructed by the association learning engine.

18. The method of claim 6, wherein the association model is constructed by an association learning engine based on temporal relations between the plurality of activities and the plurality of actions.

19. The method of claim 18, wherein the similarity between the activity type of the upcoming activity and the activity type of the defined activity is based on the association model constructed by the association learning engine.

20. The non-transitory computer readable medium of claim 10, wherein the computer program further comprises computer readable program code that when executed causes the at least one processor to control an association learning engine to construct the association model based on temporal relations between the plurality of activities and the plurality of actions.

* * * * *